Figure 1A:
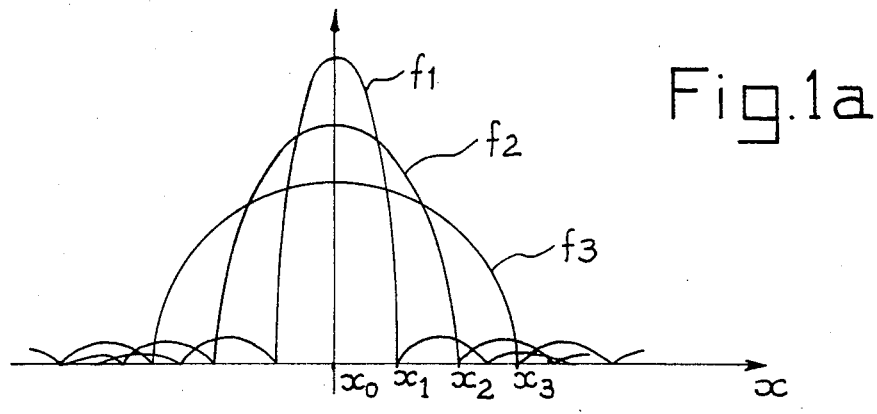

United States Patent [19]

Maerfeld

[11] Patent Number: 4,794,929
[45] Date of Patent: Jan. 3, 1989

[54] ECHOGRAPHY PROBE AND ECHOGRAPH FITTED, WITH A PROBE OF THIS TYPE

[75] Inventor: Charles Maerfeld, Constance, France

[73] Assignee: C G R Ultrasonic, Villenoy Les Meaux, France

[21] Appl. No.: 19,976
[22] PCT Filed: Jun. 3, 1986
[86] PCT No.: PCT/FR86/00189
    § 371 Date: Feb. 3, 1987
    § 102(e) Date: Feb. 3, 1987
[87] PCT Pub. No.: WO86/07466
    PCT Pub. Date: Dec. 18, 1986

[30] Foreign Application Priority Data

Jun. 7, 1985 [FR] France ............... 85 08643

[51] Int. Cl.⁴ .............................. A61B 10/00
[52] U.S. Cl. .................. 128/660.07; 73/625; 73/628
[58] Field of Search .......... 128/660; 73/625, 627, 73/628

[56] References Cited

U.S. PATENT DOCUMENTS

| | | | |
|---|---|---|---|
| 3,735,337 | 5/1973 | Long | 367/150 |
| 4,168,482 | 9/1979 | Sternberg | 367/150 |
| 4,332,018 | 5/1982 | Sternberg et al. | 367/150 |
| 4,480,324 | 10/1984 | Sternberg | 367/150 |
| 4,649,927 | 3/1987 | Fehr et al. | 128/660 |
| 4,671,293 | 6/1987 | Shaulov | 128/660 |
| 4,677,981 | 7/1987 | Coursant | 128/660 |

FOREIGN PATENT DOCUMENTS 2052917A 6/1979 United Kingdom ............... 128/660

Primary Examiner—Francis J. Jaworski
Assistant Examiner—George Manuel
Attorney, Agent, or Firm—Oblon, Fisher, Spivak, McClelland & Maier

[57] ABSTRACT

An echography probe wherein homogenization of the directivity of the points of the strip. The material constituting the strip possesses a coefficient of absorption which depends on the frequency. The profile of the strip is determined by the knowledge of the law of the variation of this coefficient of absorption as a function of the frequency. It is shown that the pattern of directivity of a probe fitted with a strip of this type is independent of the working frequency.

The invention finds particular application in medical echography for tissue characterization.

16 Claims, 3 Drawing Sheets

ECHOGRAPHY PROBE AND ECHOGRAPH FITTED, WITH A PROBE OF THIS TYPE

BACKGROUND OF THE INVENTION

The present invention pertains to an echography probe and an echograph especially designed for use in medicine.

Among the methods of investigation used to depict parts of the human body, echography has a special place. In particular, it is used to depict phenomena involving the flow of blood, often in the region of the heart. It is also used to depict cross-sections of organs located before a measuring probe. An echograph used to make echograms comprises means to produce a sound pulse and a probe by which body to be examined is subjected to the effects of this pulse. It also comprises a probe to receive the sound wave backscattered back to the body after this body has been thus excited. Processing means are used to measure the characteristics of the received signal. These processing means may be linked to storage means, or directly to imaging means to depict an image of the distribution of the measured characteristics. A special kind of measurement pertains to the characterisation of the tissues: this measurement consists in delivering, to each part of the body, a pulse with a sound absorption coefficient which is proper to the nature of the body at the part considered, because an ultrasonic wave is absorbed in varying degrees, depending on the nature of the body. The measurement of the absorption coefficient is therefore representative of the nature of the tissues which constitute the body.

The absorption coefficient of a tissue is expressed in decibels per centimeter and per megahertz. This coefficient, which is called $\alpha$ in specialist literature, expresses for example, the fact that an ultrasonic wave emitted at 10 MHz and penetrating to a depth of up to 5 centimeters inside the body (10 cm. back and forth) will have undergone an attenuation of $100\alpha$ dB (100 dB if $\alpha=1$) when coming out of the body. In other words, with a known working frequency and a known amplitude of received signals coming from two points at varying distances (the position of these points being known because the velocity of the sound wave in the body is known) it is possible to deduce the value of the coefficient $\alpha$ at an intermediate point between these two first points. For this measurement of the absorption coefficient, a measurement is made of the frequency alteration of the backscattered signal in a spectral band. Allowance is made for the fact that if the spectrum of the pulse which excites the body is Gaussian around a central frequency $f_0$, the spectra of the backscattered signals received, pertaining to those parts of the body which are located on either side of the point in question, are also Gaussian but with decreasing central frequencies, depending on whether the points are further away from or closer to the place of emission.

The alteration contributed by the body, defined as being representative of the absorption coefficient, consists firstly, in the dampening of the amplitude of the signal (the energy received decreases with time) and secondly, in the shifting of the central frequency of the Gaussian spectrum of the received signal towards the low frequencies. In the measurement of an absorption coefficient, the amplitude attenuation is not noted. However, the shift of the central frequency of the spectrum is directly interpreted as being representative of the tissue to be characterized. Finally, the characteristic measured is the capacity of a tissue to shift the central frequency to a greater or a smaller extent, depending on a unit distance between the two points.

FIELD OF THE INVENTION

Medical echography probes generally comprise an ultrasonic reversible emitter/receiver element. Generally, the depth of the zone explored in the body is smaller than the Fresnel distance of the antenna formed by this element. To enhance the signal-to-noise ratio at reception, this aerial is fitted, according to a method known in the prior art, with focusing devices. These devices may be constituted by the shape of the radiating element or by delayed excitation electronic circuits for the various parts of this element. The power of a signal emitted by this antenna can be measured in a focal plane which is perpendicular to the direction of the propagation and passes through the point on which the antenna is focused. Since the antenna has a finished size, it can be shown (and this is confirmed in practice) that the value of this power as a function of an abscissa taken along an axis of the plane follows a Bessel function. The zeros of this Bessel function are separated from the focal point by a distance which is a function of the frequency and dimensions of the radiating element. The immediate result of this is that the directivity of the antenna is not constant with the frequency.

This is especially irksome for the measurement of the tissue characterization as referred to above. For, in this characterization of the tissue, a measurement is made of the central frequency of a Gaussian spectrum, the entire spectral data of which is taken into account. The differential alteration of the received signal, depending on the frequency and the place of the backscattering which gives rise to this signal, then causes aberrations. Experience sometimes shows a drift of the echo spectrum towards the high frequencies while the distance increases. This paradoxical observation would correspond to a negative absorption, something which is incomprehensible. In fact, this phenomenon can be quite certainly attributed to the disturbing effect caused by the dependance of the directivity of the antenna as a function of the frequency.

DESCRIPTION OF THE PRIOR ART

It is known, in the prior art, how to provoke modifications of the power curve, or diffraction pattern, given by any antenna whatsoever. Since this diffraction pattern in the focal plane is the Fourier transform of the distribution of the vibrational amplitudes of the points of the antenna, it suffices to modify this distribution in order to modify the diffraction pattern. In acoustics, at a given working frequency, a law of non-uniform distribution of the amplitudes transmitted is introduced in order, for example, to reduce minor directivity lobes. This law of non-uniform distribution consists, finally, in accordingly weighting the contributions of each part of the antenna. However, with this technique, the directivity is not modified with the frequency since the weighting is calculated at a given frequency.

SUMMARY OF THE INVENTION

The invention therefore makes it possible to remedy the disadvantages referred to by assigning, to each part of the antenna, a weighting which can vary with the frequency. As we shall see further, this weighting according to the frequency can be obtained electronically or mechanically. Filters are arranged in series with the parts of the antenna, the pass-band of these filters being dependent on the coordinates of these parts in the antenna. In this way, the apparent area of radiation of the antenna is modified in accordance with the frequency. It is seen to it that the modification corresponds to a constancy of the directivity.

The invention pertains to an echography probe of the type comprising a radiating element to radiate, through at least one of its faces, a sound wave when it is subjected to an excitation and/or to receive a sound wave through this face and to prepare a signal corresponding to this wave when it receives it, wherein the probe comprises means to modify the pass-band of the various parts of the face of the element depending on the coordinates of these parts, in such a way as to make the directivity of the probe independent of the frequency.

Figure 1B:
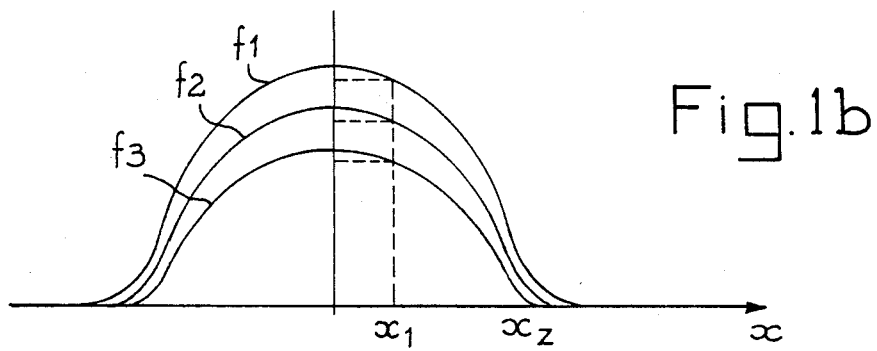
Figure 2:
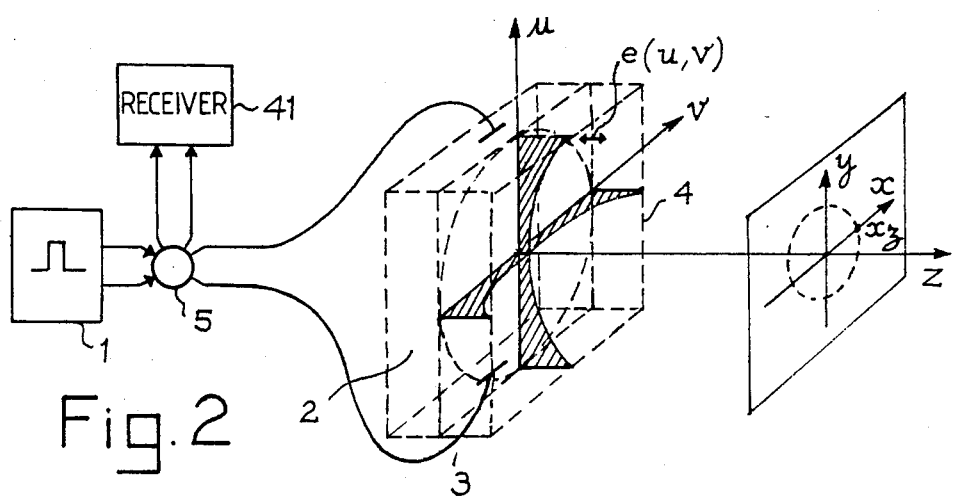
Figure 3A:
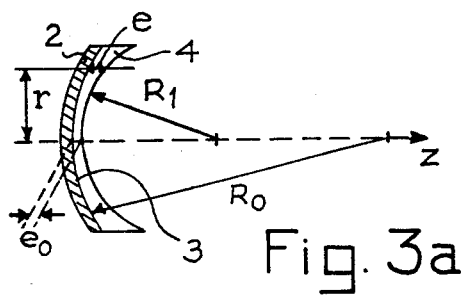
Figure 3C:
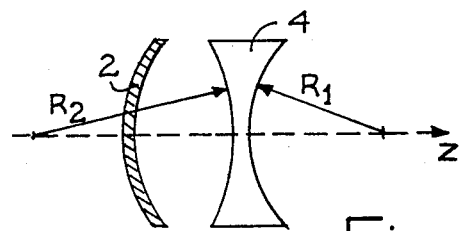
Figure 3B:
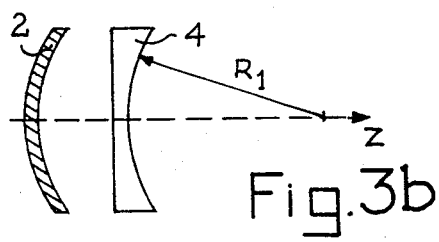
Figure 4A:
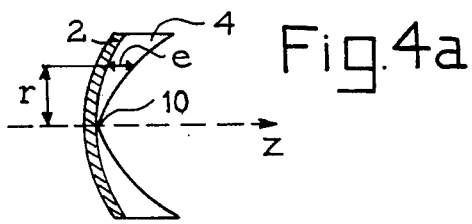
Figure 4B:
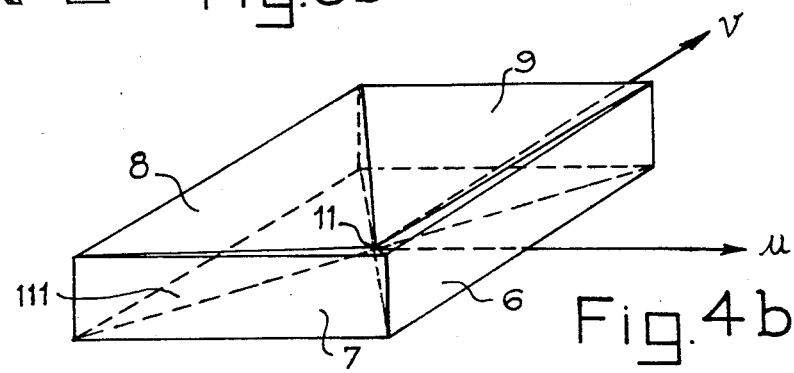
Figure 5:
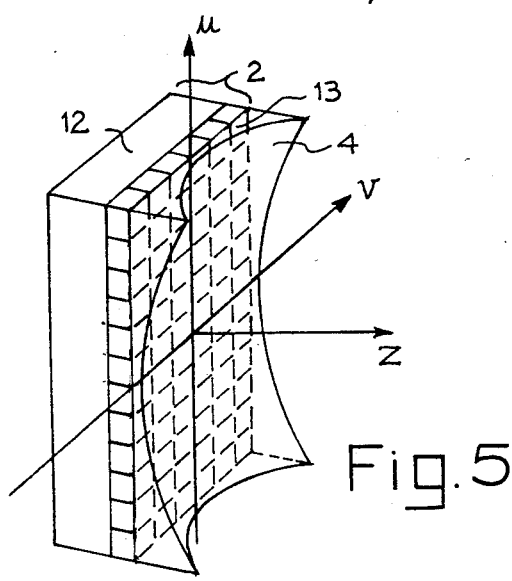
Figure 7:
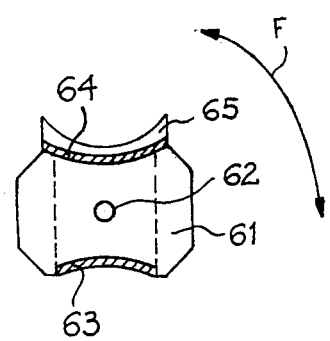
Figure 6A:
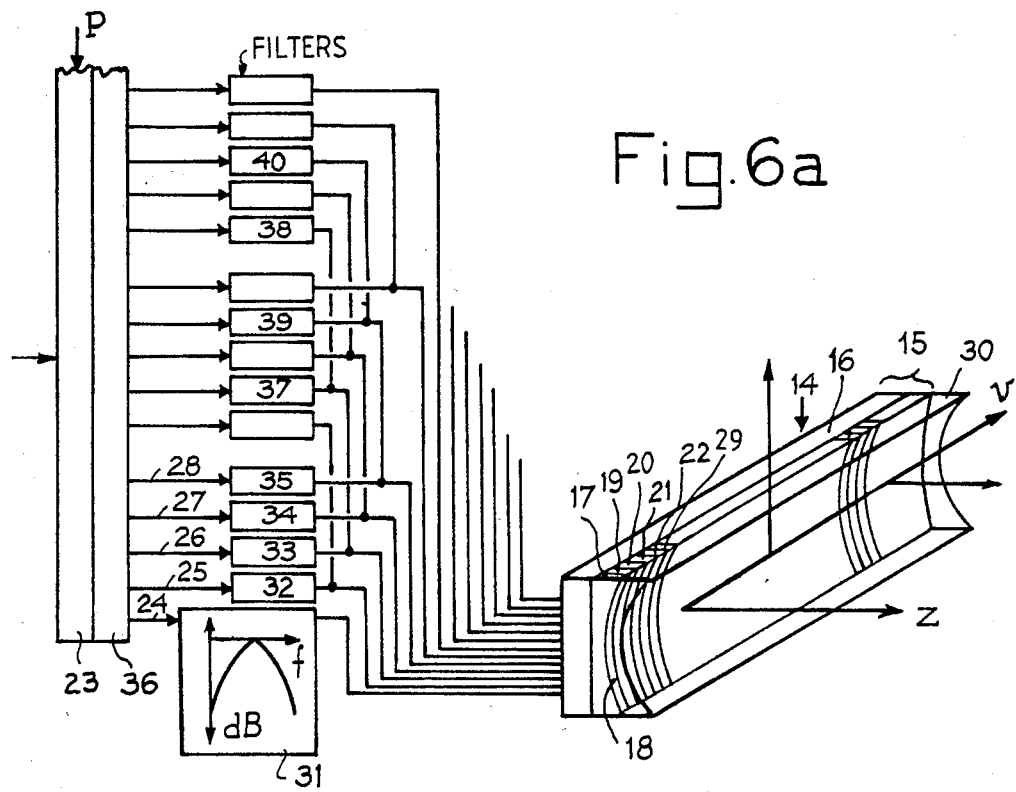
Figure 6B:
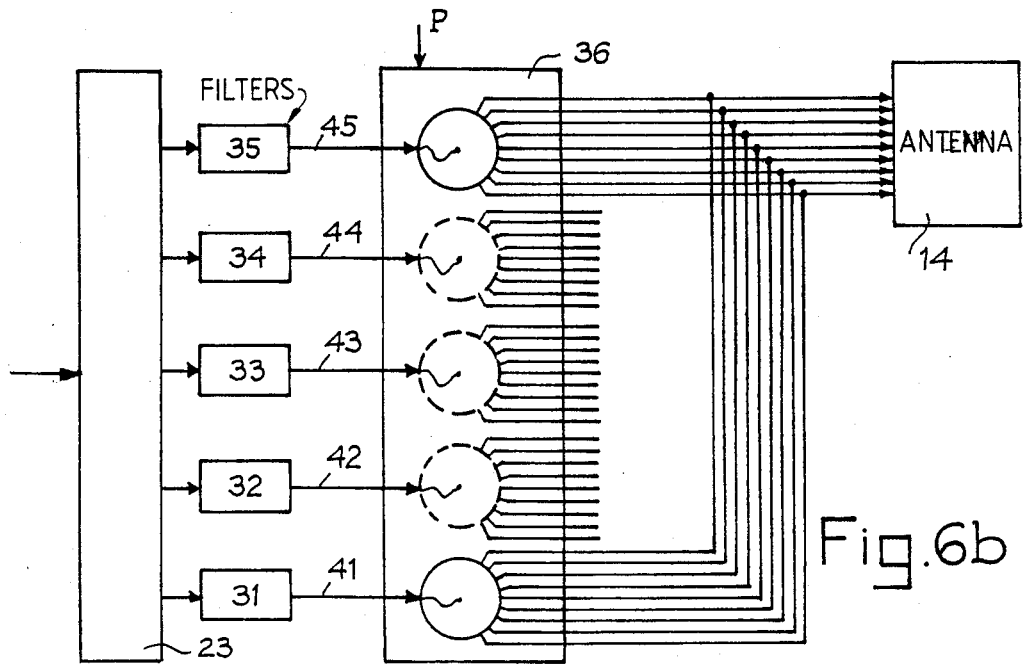

The present invention will be better understood from the following description and from the examination of the accompanying figures. These figures are given only by way of indication and in no way limit the scope of the invention. In these figures, the same references designate the same elements. The figures are:

FIGS. 1a and 1b: schematic depictions of diffraction patterns of the radiating element without and with the invention, respectively;

FIG. 2: a mechanical alternative embodiment of the invention;

FIGS. 3a to 3c, examples of embodiments of mechanical filters made of a material with low diffusivity, corresponding to an alternative embodiment of FIG. 2;

FIGS. 4a and 4b: another example of an embodiment made of another material which, for its part, is diffusive;

FIG. 5: the application of the mechanical alternative embodiment to a network of transducers comprising the radiating element;

FIGS. 6a and 6b: an example of the use of the electronic alternative embodiment of the filters in common with the use of the mechanical alternative embodiment;

FIG. 7: an example of the application of the invention in its use.

FIG. 1 represents the diffraction pattern of a radiating element according to the state of the prior art. The figure clearly shows that the directivity is dependent on the frequency. In particular, the zeros, the recurrent points $x_1$, $x_2$..., are spaced out from the line $x_o$, with the focus depending on the frequency component $f_1$, $f_2$ or $f_3$ of the wave considered. Besides, in three abscissae $x_o$, $x_1$ with $x_2$, the spectral contributions do not follow a homogeneous development. In $x_1$, the contribution $f_1$ is the smallest, in $x_0$ it is the biggest, in $x_1$ it is contribution $f_2$ which is the biggest etc. Since, in the measurement of the tissue characterisation, the spectrum comprising $f_1$, $f_2$ and $f_3$ is taken into account comprehensively, and this situation does not favor the homogeneity of the results. FIG. 1b represents, in the same circumstances and for the same frequencies, the schematic diffraction pattern obtained with the means of the invention. To do this, each part of the antenna has been weighted, firstly according to its geographical location and, secondly, according to the frequency in such a way that the zeros of the diffraction pattern are all located at the same places $x_z$. This results in a homogeneous distribution of the contributions of the various parts of the spectrum.

The calculation of the filter at a given abscissa on the antenna should be done to obtain the power curves which appear in FIG. 1b. This figure provides information depending on the frequencies on the transfer functions of the filters. The following is the procedure to be followed for the calculations of the filters: starting from FIG. 1a, which is a known and specific representation of the antenna element used, the necessary weightings at each place on the antenna are made for each frequency at each place to bring the zeros or minimum values to agreed positions, at $x_z$. A measurement is then made, at each place on the antenna, of the weighting relative to this frequency which can be used to obtain this weighted diffraction pattern. From these measurements of weighting made for all the frequencies, the filters assigned to each abscissa are deduced.

In a first alternative embodiment of the invention, the filter is made by means of an absorption strip. FIG. 2 depicts a strip of this type mounted in a probe of an echograph. In the example, the echograph comprises a transmitter 1 linked to a piezoelectric element 2 to emit a sound wave through one of its faces 3. The sound wave is propagated along an axis Z in an body which is not depiected. When the probe is reversible, the element 2 can receive a sound wave on its face 3, which it transforms into a corresponding electrical signal and which can be received in a receiver 41. This receiver 41 symbolically depicts all the subsequent processing undergone by the received signal. A duplexer 5 enables transmitting or receiving operation by correctly orienting the transmission of the electrical signals. In the invention, to make up for the directivity fault of the element 2 as a function of the frequency, a strip 4 has been interposed between the face 3 and the body, the thickness of this strip depending on the coordinates of its points. In other words, the thickness e of the strip depends on the coordinates u and v of the points of the given strip in a plane perpendicular to Z.

To reach the goal set, a material is chosen for the strip, the absorption coefficient $\alpha$ of which has the form: $\alpha = \alpha_o f^m$. In this expression, m is the corrective coefficient of the sound absorption coefficient of the strip as a function of the frequency f. For, as with the tissues to be characterized, the materials have absorption coefficients which depend on the frequency. It is precisely this dependence on the frequency which is put to advantage here to make a frequency filter. The weighting is made by interposing varying thicknesses of materials in the path of the elementary vibrations coming from the elementary parts of the face 3. In this way, a greater or smaller weighting is given. The thickness at all points of the strip, with the coordinate (u, v), is given in the invention in the form of a formula.

This formula is the following one:

$$e(u, v) = e_o + \sum_{i=0}^{i=m} a_i \cdot u^{m-1} \cdot v^i$$

In this formula, $e_o$ is a thickness chosen as a function of the feasibility of the strip (this point will be explained later); u and v are coordinates of the points of the strip; m is the corrective coefficient referred to above; i is a standard index. The coefficient m is specific to the material constituting the strip as is $\alpha_o$. The material is preferably chosen in such a way that m is substantially a whole number: for example, 1 or 2 etc. The parameters $a_i$ are parameters of the polynomial in u and v which determine e. They can be chosen as desired. The expression of e given above is such that the vibrational amplitude A (u, v) output from the strip at each point takes the following form:

$$A(u, v) = C \cdot \exp -a_0 \sum_{i=o}^{i=m} a_i U^{m-1} V^i$$

In this expression, C is a constant and U and V are reduced coordinates which are respectively equal to u.f and v.f.

If the vibrational contributions are added up to arrive at the diffraction pattern in the focal plane, it is seen that this sum yields a result which is now independent of the frequency. The consequence of this is that any thickness of the strip which satisfies the expression seen above of e (u, v) is a solution to our problem.

FIGS. 3a to 3c depict modes of embodiment in which the material of the strip is such that its corrective coefficient m equals 2. This material is, for example, a viscoelastic polyurethane or a polymerized resin. A particularly worthwhile solution for the parameters $a_i$ is such that $a_0=a_2$ and such that $a_1$ equals zero. Therefore, the thickness can be written as follows: $e(u,v)=e_0+a_0 r^2$. In this expression, r is the radial distance from any point whatever of the strip to the axis Z of the progagation of the wave. In other words, in this example, the thickness increases parabolically with the radial distance. If the radiating element 2 has the shape of a spherical cup with a radius $R_o$, there is a particular solution for the strip 4 wherein this strip may be advantageously obtained by two spherical machining operations: one with a radius $R_o$ and another with a radius $R_1$. The relation then links $R_1$ to $a_o$ and $R_o$ as follows:

$$a_o = \frac{1}{2}\left(\frac{1}{R_1} - \frac{1}{R_o}\right)$$

In this preferred solution, the strip 4 can then be bonded to the emissive face 3 of the cup-shaped element 2 (FIG. 3a). When the strip 4 is bonded to the cup 2, the thickness $e_o$ at the middle of the strip can be reduced to the minimum. However, it is noted that, since the thickness increases parabolically with the radial distance r, this thickness $e_o$ can hardly be nil. For, near the center, the surfaces on either side of the strip tend to be at a tangent to each other. Since it is not possible to reduce the thickness $e_o$ to zero, it will be attempted to make it as small as possible.

The FIGS. 3b and 3c depict alternative modes of embodiment of the strip 4 wherein the two sides of this strip are also obtained by spherical machining. In FIG. 3b, one of the spheres even has an infinite radius: the machining is plane. In FIG. 3c, the two machined spheres are external to each other. The second strip is a plane-concave strip and the third strip is a bi-concave strip. The parabolic machining envisaged can be approached by a spherical machining insofar as the angle at the center of the ends of the concave surface is a small one. With this carefully worked out approximation, it is possible to cope with manufcturing problems in an efficient way.

FIGS. 4a and 4b are cross-section and perspective drawings of the curve of another strip which possesses the frequency filtering characteristics recommended by the invention. In this example, the material of the strip is a material, the absorption of which is derived essentially from diffusion. For example, the material of the strip is hardly viscoelastic, it is charged with inhomogeneities which increase the diffusion. This material is, for example, an epoxy resin. The inhomogeneities are, for example, hollow phenol-based or glass micro-beads. In this case, the absorption coefficient α of this material is proportionate to the frequency. For, with a material of this type, the coefficient m is close to 1. By bringing m into the expression of e(u,v), we can write:

$$e(u,v) = e_0 + a_0 u + a_1 v = e_0 + a_0 r$$

is $a_o$ is taken to be equal to $a_1$.

In this expression, r is the radial distance from any point on the strip to the axis of propagation Z. In FIG. 4a, the strip 4a can have the shape of a volume of revolution, the section of which, passing through a plane containing the axis of revolution (Z), approaches the shape of a triangle. Hence, the thickness of the strip is indeed proportionate to the radial distance from the points on the strip to the axis of revolution. In FIG. 4a the generating section of the volume of revolution is even planned so that it can be fitted to the interior of a spherical radiating cup 2. It is known how to make such volumes of revolution where, finally, the thickness $e_o$ at the center is nil or practically nil. For the two sides of the strip 4, at the center 10, are secant to one another.

The shape of the strip may also be made up of four pyramids, marked 6 to 9 in FIG. 4b, joined to one another by their vertex 11 and coupled together in twos by faces such as 111. The pyramids meet one another in the planes where u=v. The value of this method also lies in the fact that the tendency of the two faces of the strip, at the place where they approach the vertex 11, is a secant tendency. At the vertex 11, the two faces of the strip are not tangential to each other. Hence, it is also possible to make a zero thickness $e_o$ there. Besides the machining of pyramid-shaped parts is well known.

The law of variation of the absorption coefficient α with the frequency is estimated at $a_o f^m$ in the useful pass-band of the measured signals, m being generally equal to 1 or 2. The determination of the value of the coefficients $a_o$ to $a_2$ is given by the knowledge of the pass-band of the filter at any point of the coordinates u and v of the strip. For, so as to obtain the diffraction pattern of FIG. 1b, we were previously led to calculate variable weightings as a function of the coordinates of the points of the radiating element, and as a function of the selected working frequency. It now suffices to select any point, with coordinates u v, and to calculate the corresponding thickness of the strip 4 at this point for the frequency response of the strip to correspond (to the nearest coefficient: thickness $e_o$) to the frequency weighting curve assigned to this point. From this it is possible, knowing u and v, to deduce the value of the coefficients $a_o$ to $a_2$ or all the useful coefficients $a_i$. The knowledge of $R_1$ is derived from the knowledge of $a_o$. It can be shown by calculation (and experiment confirms this point) that for a material with a given index m, there is only one law determining the pattern of the thickness of the strip as a function of the coordinates of its points.

Owing to the difference in thickness interposed along the paths of propagation of the sound vibrations coming from the various points of the antenna, a phenomenon of spurious focusing is created, similar to a known phenomenon in optics when a lens is interposed on an optical axis. In practice, the echography probes are applied directly against the body into which sound is to be sent. The focusing of the radiating element already takes into account the index of propagation of sound waves in this body. Two cases can arise then. In the first, the index of propagation of the sound waves in the material of the strip fis identical to that of the body into which the sound has been sent (or at least identical to the mean of the indices of propagation of those parts of this body in those regions which are effectively characterized). There is then no reason to modify the original focusing in any way whatsoever: the interposed strip only shifts the planes of measurement (by a thickness of $e_o$). However, in the latter case, if this index of sound propagation in the strip is not the same as that of the body, the concave shape of the strip causes a modification of the initial focusing of the radiating element. In these circumstances, there is reason to accordingly modify the focal length of this radiating element to take into account the alteration contributed by the presence of the strip. There are known methods in optics to solve these problems. The methods by which they can be solved in this case are of the same order. For example, the radius of curvature of the cup (2) can be modified.

FIG. 5 depicts a radiating element with several transducers. The radiating element 2 here comprises a pedestal 12 surmounted by several piezoelectric transducers 13. Each transducer can be linked to an independent electrical excitation circuit. In this case, the focusing of the sound wave on the focus placed on the axis Z can be obtained by suitably delaying, with respect to one another, the electrical signals which drive each of the transducers 13. This technique is already known in the prior art. The absorption strip 4, with a thickness that varies according to the coordinates of the points, is applied above the set of transducers 13. It is, for example, the same as the one described in FIG. 3b. Then the strip 4, this time in the presence of electronic focusing, fulfils its role of homogenizing the directivity of the radiating element according to the frequency.

By contrast, FIGS. 6a and 6b describe the use of a homogenization of the directivity of the radiating element as a function of the frequency obtained by electronic means. In fact, in this alternative embodiment depicted in these FIGS. 6a and 6b, the homogenizing of the directivity is obtained by a combination of mechanical and electronic means. Because they are simple to manufacture, mechanical means (acting on the variable thickness of an interposed strip) are preferred. They are well suited to radiating elements, the propagating direction Z of which is constant (FIGS. 2 to 4b) or to radiating elements, the propagating direction of which may oscillate angularly around a main direction (direction Z of FIG. 5). However, these mechanical means are ill-suited to situations in which a lateral scanning of the body is sought to be obtained. In a lateral scanning operation, this axis of propagation is expected to shift parallel to itself in a direction perpendicular to this axis.

For example, in FIG. 6a, the antenna 14 is designed to emit sound pulses which are propagated in a direction Z which gradually shifts parallel to itself along a direction v which is perpendicular to Z. It can be easily understood that this scanning in translatory motion cannot be obtained, with the improvement of the invention, in the example of the antenna of FIG. 5. For if the axis Z shifts in a direction parallel to itself, the variation in the thickness of the strip will not be the same along the abscissa u regardless of the ordinate v where one is positioned. It is especially for this scanning application that the electronic alternative of the invention is shown here.

The radiating element 15 of the antenna 4 of FIG. 6a somewhat resembles that of FIG. 5. It comprises, in particular, a base 16 which supports several piezoelectric transducers mounted on it, such as the transducers 17. The transducers 17 are elongated in shape and have a concave emissive surface so that their emission is focused in a plane containing the axis of propagation Z and the direction v of the side-by-side alignment of these transducers with one another. The profile 18 of the emitting surface of the transducers thus gives them a mechanical focusing characteristic. The focusing of the sound waves in another plane containing the axis Z and the axis u perpendicular to the axis v is obtained by grouping the transducers (for example, in sets of five: transducers 17, 19, 20, 21 and 22) and by delaying, relatively to one another, the signals 24 to 28, which drive these various transducers, in a delaying circuit 23. In this way, the sound wave emitted is focused on a focus which is at the intersection of the two planes.

The scanning itself is got by shifting the grouping of the transducers used for the emission of the sound wave. This shifting, in an example depicted in FIG. 6a, comprises shifts of one transducer. in a second grouping the transducer 17 is abandoned. However, a transducer 29 adjacent to the transducer 22 is acted upon, and in this way, the scanning of the body is continued.

The homogenization of the directivity of the antenna as a function of the frequency is obtained here also in a combined way. Along the direction u, the homogenization is obtained mechanically: that is, by the addition of an absorbent strip 30 with a thickness that varies according to the abscissa of the points of the strip. The profile of this strip 30 is similar to the profile of the strip 4 of the FIG. 3a. This profile acts as a generating contour to a cylindrical strip, the generators of which are directed along the axis v.

The homogenization, along the axis v, of the directivity of the antenna as a function of the frequency is obtained here by interposing frequency filters, such as 31 in the excitation circuit of the various transducers of a grouping. The various filters 31 to 35 of the transducers of a grouping do not have the same pass-band: the coefficient of attenuation, according to the frequency, which they introduce depends on the position of the group of transducer elements to which they are linked. To simplify the description, the filter 33, connected in series with the transducer 20 of the body has a bigger pass-band than the identical filters 32 and 34 which are connected in series with the adjacent transducers 19 and 21 on either side of the transducer 20. The identical filters 31 and 35, connected in series with the transducers 17 and 22 respectively, again have a smaller pass-band. The calculation of these filters is done according to the calculation made to determine the thickness of the strip.

In other words, the grouping of the first five transducers, which has a mechanical focusing in a plane containing the axis v and an electronic focusing in a plane containing the axis u, now possesses mechanical means for the homogenization of the directivity as a function of the frequency, these means being mechanical along the axis u and electronic (the filters 31 to 35) along the axis v. It is necessary to distinguish between the delaying means 23 which cause the electronic focusing and the frequency filter means 31 to 35 which cause the homogeneity of the directivity. The electronic filters are the equivalent of the mechanical filter formed by the strip. The application of the electronic alternative embodiment to scanning is only one example among others for the use of this alternative.

Once the pointing direction corresponding to an initial grouping has been explored, the body is scanned laterally by making a shift of one position and exploring the body in a pointing direction relative to the second grouping: for example, comprising transducers 19, 20, 21, 22 and 29. The mechanical focusing is obtained by the fact of the cylindrical nature of the face 18. The electronic focusing is obtained by the switching over of the signals 24 to 28 to the new transducers chosen. This switching over, which is well known in the prior art, is not described here. It is provoked by electronic circuits 36 which also receive a sequencing signal P which determine it.

The electronic filters can be interposed before the transducers in two ways. In a first way described in FIG. 6a, the switching-over means 36 and delaying means 23 are cascade-followed by directivity-homogenizing filters. As a consequence, each transducer will have several filters assigned to it. It will have as many filters assigned to it as the number of times it belongs to a grouping used in the scanning. In the example, with groupings of five transducers and with shifts of one transducer, each transducer (apart from the four located at each end of the radiating element) comes into action five times: for five pointing directions. Hence five filters will be assigned to it, the transfer function of these filters being each time relative to the position which will be occupied by this transducer in the grouping relating to the pointing direction in question.

But the transducers of one group, located on either side of the central axis of propagation of the grouping of transducers, must be weighted in frequency by filters of the same pass-band. The result of this is that each transducer can be linked to the same filter as earlier when it occupies, in a following grouping, a position which is symmetrical to the one initially occupied. Thus, the transducer 20, which is central to the first grouping, is in series with the filter 33 for this grouping. In the second grouping, shifted by one position, it is in series with the filter 27. In the third grouping, it is in series with the filter 38 etc. Similarly, the transducer 22 which is the fifth from the end, is successively in series with a filter 35, 39, 40, etc. for the fourth pointing direction, this transducer 22, which is still acted upon, can again be connected in series with its filter 39. For a fifth pointing direction, it can be reconnected in series with its initial filter 35.

It can be shown that for a strip of transducers constituting the radiating element 15 and containing N transducers, there will be grounds to make N filters such as the filter 31 (identical to the filter 35); it will also be necessary to make N-1 filters such as the filter 32 (or 34, or 37 or 39). Finally, it will be necessary to make N-2 filters such as the filter 33. In an example where a strip of 80 piezoelectric transducers are used, this method can be envisaged since the number of filters is not prohibitive and also since the filters can be batch-produced as the types of these filters is limited to three.

However, if this embodiment is deemed to be too costly, another method which could be used would be to shift the switching-over means 36. FIG. 6b shows that these switching-over means have been interposed between the filter and the antenna 14. In this case, the delaying means 23 providing the electronic focusing are directly upstream of the filters 31 to 35 which provide the homogeneity of the directivity as a function of the frequency for a generic grouping of five transducers. The signals 41 to 45 which emanate from these filters drive the change-over switch 36 receiving the command P which acts on selectors such as 51 to 55 to drive these signals to selected transducers in a grouping of transducers. The switching-over means 36 are means known in the prior art. With the electronic homogenization thus obtained along the axis v, the homogenization along the axis u is obtained by the presence of the cylindrical strip 30.

FIG. 7 is a cross-section of a probe for a special application of the invention. The invention pertains to an echograph with a rotary probe. In this probe, an antenna 61 rotates around an axis 62 as schematically illustrated by the arc F. This antenna comprises two radiating elements: an element 63 and an element 54 which are diametrically opposite to each other with respect to the rotational axis of the antenna. The two elements have the same focusing power. The first radiating element is not provided with the means of the invention for the homogenization of directivity. The second is fitted with an absorbent strip 65 according to the invention. The two radiating elements 63 and 64 are cup-shaped. The element 64 has a greater diameter to allow for the frequency weighting provided to the strip. As a consequence, the directivity of the element 64 is now the same as the directivity for a central frequency of the spectrum with the directivity of the radiating element 63.

A region of the body can thus have sound sent inside it by both elements in turn. The division of time is compatible with the acquisition of television signals: the rotation speed is about 50 rpm. The backscattered signal received by the element 63 is processed to obtain a conventional image. A conventional image is, for example, an image where each part of the body is depicted as a function of the amplitude of the echo which it has caused. The backscattered signal received by the radiating element 64 is also processed to obtain a conventional image. But it can also be processed by spectral analysis to obtain an image characterizing the body. The value of this solution lies in the comparison of the images produced. It is possible to superimpose and combine these two images together with color imaging means. The conventionally detected signal is applied to the luminosity control of a television screen. Its resolution is good and the outlines of the image are fine. The signal detected by the element 64 is applied to the chrominance control of this screen. Its resolution is not as good but it corresponds well to the chrominance control, the spatial definition of which is less severe. The images obtained in this way are brighter and more precise.

In practice, the absorption strip of the invention has a thickness which is far greater than the wavelength of the central wave emitted and backscattered. Its thickness at mid-diameter is about 1 millimeter while the frequency of this wave is about 20 MHz.

What is claimed is:

1. Echography probe comprising a radiating element having at least a radiating face to radiate, through said radiating face, a sound wave in response to an electrical excitation to which said element is subjected and/or to receive a sound wave through said radiating face and to produce an electrical signal corresponding to the reception of this sound wave, said probe and said radiating element having a directivity dependent from a frequency utilized, wherein the probe comprises means to modify the pass-band of the different parts of the face of the element according to the coordinates of these parts, in such a way as to make the directivity of the probe independent of said frequency, wherein said means for modifying the band pass comprise an absorbent strip interposed between the radiating face and a body subjected to the sound wave, said absorbent strip having a sound absorption coefficient which is a function of said frequency and a thickness which is greater than the wavelength of the sound wave through said strip.

2. Probe according to claim 1, wherein the thickness e of said strip, measured perpendicularly to the face is given by:

$$e(u, v) = e_o + \sum_{i=o}^{i=m} a_i \cdot u^{m-1} \cdot v^i, \text{ where}$$

$a_i$ are parameters of the polynomial expression of e(u, v), $e_o$ is a thickness chosen according to a feasibility of the strip, where u and v are coordinates of points of the strip located in a plane parallel to the face, and where, m is a corrective coefficient of sound absorption of the strip as a function of the frequency.

3. Probe according to the claim 2, wherein the strip has an index of sound propagation which is equal that of the body subjected to the sound wave.

4. Probe according to the claim 2, wherein the strip has an index of sound propagation which is different from that of the body subjected to the sound wave, and wherein a focusing of the probe is modified accordingly.

5. Probe according to any one of the claims 2, 3 or 4, wherein the strip is made out of a material such that said corrective coefficient of said strip is approximately equal to two, and wherein said parameters $a_i$ of said polynomial are such that $a_1=0$ and such that $a_o=a_2$.

6. Probe according to said claim 5, wherein the parameters $a_o$, $a_2$ and $e_o$ are such that the strip can be included between two spheres.

7. Probe according to the claim 6, wherein the material of the strip is a polymerized resin.

8. Probe according to any one of the claims 2, 3 or 4, wherein the strip is made out of a material such that said corrective coefficient of said strip is approximately equal to one and wherein said strip comprises four pyramidal parts which are symmetrical by a vertex and to one another by sides.

9. Probe according to any one of claims 2, 3 or 4, wherein the strip is made out of a material such that said corrective coefficient is approximately equal to one, wherein the strip is of revolution around an axis and wherein the strip has a substantially triangular shaped profile parallel to this axis.

10. Probe according to the claim 9, wherein the material of the strip is hardly viscoelastic and wherein it is charged with diffusive inhomogeneities.

11. Probe according to claims 1 or 2, wherein said radiating element comprises several transducers arranged on said radiating face and wherein the modifying means comprise frequency filters to act on said electrical excitation and/or said electrical signal, the pass-band of said filters being determined according to the position, on the face, of a tranducer to which each of said filters is connected.

12. Probe according to the claim 11, wherein the transducers are aligned alongside one another in a direction perpendicular to the axis of radiation and wherein the modifying means comprise a cylindrical strip, the generators of which are parallel to the direction of alignment, and at least one set of frequency filters to assign these filters to transducers so as to enable a homogenization of the directivity of the probe according to the frequency along two axes which are perpendicular to the axis of propagation.

13. Probe according to the claim 12, comprising a set of filters and switching-over means interposed between the filters and the transducers to switch the transducers over to the filters of this set and to thus enable a scanning of the body examined.

14. Probe according to the claim 12, comprising several sets of filters and switching-over means arranged upstream of the sets of power each transducer through the filters of the sets allocated to this transducer.

15. Probe according to any one of the claims 1, 2, 3 or 4, wherein the strip is placed flat against the face of the element.

16. Probe according to any one of the claims 1, 2, 3 or 4, further comprising another radiating element which is used alternately with the first one to enable a comparison between the signals prepared by each of these radiating elements.

* * * * *